United States Patent
Fingleton et al.

(10) Patent No.: US 9,273,610 B2
(45) Date of Patent: Mar. 1, 2016

(54) STARTER/GENERATOR COMBINATION WITH ALL VARIABLE FREQUENCY DRIVES

(71) Applicant: SOLAR TURBINES INCORPORATED, San Diego, CA (US)

(72) Inventors: Daniel Fingleton, San Diego, CA (US); Rachel Bruno, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 99 days.

(21) Appl. No.: 14/282,471

(22) Filed: May 20, 2014

(65) Prior Publication Data
US 2015/0337737 A1    Nov. 26, 2015

(51) Int. Cl.

| | |
|---|---|
| F02N 11/04 | (2006.01) |
| H02K 23/52 | (2006.01) |
| H02P 9/04 | (2006.01) |
| F02C 6/00 | (2006.01) |
| F02C 7/275 | (2006.01) |
| H02P 5/74 | (2006.01) |
| F02C 3/107 | (2006.01) |
| F02C 7/32 | (2006.01) |
| F02C 7/12 | (2006.01) |
| F02C 7/22 | (2006.01) |
| F02C 7/06 | (2006.01) |
| F01D 15/10 | (2006.01) |
| H02K 7/18 | (2006.01) |
| H02P 5/00 | (2006.01) |

(52) U.S. Cl.
CPC ............... *F02C 7/275* (2013.01); *F02C 3/107* (2013.01); *F02C 6/00* (2013.01); *F02C 7/06* (2013.01); *F02C 7/12* (2013.01); *F02C 7/22* (2013.01); *F02C 7/32* (2013.01); *H02P 5/74* (2013.01); *F05D 2220/32* (2013.01); *F05D 2260/85* (2013.01); *H02P 2005/34* (2013.01)

(58) Field of Classification Search
USPC .................................. 290/31, 52; 60/772, 791
See application file for complete search history.

(56) References Cited

U.S. PATENT DOCUMENTS

| | | | |
|---|---|---|---|
| 6,002,219 A | 12/1999 | Permuy | |
| 6,467,725 B1 * | 10/2002 | Coles | F01D 15/10 244/58 |
| 6,530,224 B1 * | 3/2003 | Conchieri | F01K 23/10 60/39.182 |
| 6,895,741 B2 * | 5/2005 | Rago | F01D 15/10 60/226.1 |
| 7,116,003 B2 | 10/2006 | Hoppe | |
| 7,250,688 B2 | 7/2007 | Thomson et al. | |
| 7,325,401 B1 * | 2/2008 | Kesseli | F01D 17/143 60/677 |
| 7,513,120 B2 * | 4/2009 | Kupratis | F01D 15/10 60/39.24 |
| 7,514,810 B2 * | 4/2009 | Kern | F01D 15/10 290/52 |
| 7,526,926 B2 * | 5/2009 | Rasmussen | F01D 15/005 290/52 |

(Continued)

FOREIGN PATENT DOCUMENTS

WO    2009067048    5/2009

*Primary Examiner* — Pedro J Cuevas
(74) *Attorney, Agent, or Firm* — Procopio, Cory, Hargreaves & Savitch LLP

(57) ABSTRACT

A gas turbine engine includes a compressor, a combustor adjacent the compressor, a turbine adjacent the combustor, a shaft, a motor, a primary variable frequency drive, an auxiliary variable frequency drive, and an auxiliary motor. The motor is coupled to the shaft. The primary variable frequency drive is electrically connected to the motor and an AC power source. The auxiliary variable frequency drive is electrically connected to the primary frequency drive. The auxiliary motor is electrically connected to the auxiliary variable frequency drive.

20 Claims, 3 Drawing Sheets

(56) References Cited

U.S. PATENT DOCUMENTS

| | | | |
|---|---|---|---|
| 8,015,812 B1 * | 9/2011 | Kesseli | F01D 17/143 60/612 |
| 8,039,983 B2 * | 10/2011 | Cote | H02P 9/04 290/32 |
| 8,191,410 B2 * | 6/2012 | Hansen | G01M 15/14 73/112.05 |
| 8,299,646 B2 | 10/2012 | Rockenfeller et al. | |
| 8,304,927 B2 * | 11/2012 | Cote | H02P 9/04 290/32 |
| 8,324,746 B2 * | 12/2012 | Bradbrook | F02C 3/113 290/1 A |
| 8,584,464 B2 * | 11/2013 | Joshi | F02C 3/10 60/726 |
| 8,853,878 B1 * | 10/2014 | White | F02C 7/36 290/52 |
| 8,935,924 B2 * | 1/2015 | Takeda | F01D 25/36 60/772 |
| 9,140,184 B2 * | 9/2015 | Ekanayake | F02C 6/00 |
| 2003/0182944 A1 * | 10/2003 | Hoffman | F01K 23/10 60/772 |
| 2006/0260323 A1 | 11/2006 | Moulebhar | |
| 2007/0137216 A1 * | 6/2007 | Joshi | F02C 3/10 60/791 |
| 2008/0264374 A1 | 10/2008 | Harris | |
| 2008/0304954 A1 * | 12/2008 | Hoffman | F01K 23/10 415/17 |
| 2010/0133813 A1 * | 6/2010 | Cote | H02P 9/04 290/32 |
| 2010/0162719 A1 * | 7/2010 | Bowman | F02C 7/32 60/773 |
| 2010/0219779 A1 | 9/2010 | Bradbrook | |
| 2011/0048119 A1 * | 3/2011 | Hansen | G01M 15/14 73/118.01 |
| 2011/0138816 A1 * | 6/2011 | Takeda | F01D 25/36 60/772 |
| 2012/0122631 A1 | 5/2012 | Galivel et al. | |
| 2013/0076120 A1 | 3/2013 | Wagner et al. | |
| 2013/0247539 A1 | 9/2013 | Hoppe | |
| 2013/0318941 A1 * | 12/2013 | Ekanayake | F02C 1/007 60/39.17 |
| 2013/0318965 A1 * | 12/2013 | Ekanayake | F02B 47/08 60/605.1 |
| 2013/0318987 A1 * | 12/2013 | Ekanayake | F02C 6/00 60/772 |
| 2014/0103846 A1 * | 4/2014 | Fingleton | H02P 23/0068 318/432 |
| 2014/0366546 A1 * | 12/2014 | Bruno | F02C 9/00 60/772 |

* cited by examiner

STARTER/GENERATOR COMBINATION WITH ALL VARIABLE FREQUENCY DRIVES

TECHNICAL FIELD

The present disclosure generally pertains to gas turbine engines, and is more particular directed toward a gas turbine engine with an auxiliary power system.

BACKGROUND

Gas turbine engines include a starter motor electrically coupled to a variable frequency drive electrically connected to an alternating current (AC) power source. The AC power source is also electrically connected to other variable frequency drives electrically coupled to motors driving pumps, ventilation fans, and/or coolers of subsystems of the gas turbine engine. However, the AC power source may fail or become interrupted.

U.S. Pat. No. 7,250,688 to Scott Thomson et al. discloses a starter/generator system for a gas turbine engine used in aeronautical applications. In a starting mode, the starter/generator system couples a single dynamoelectric machine to the gas turbine engine through a torque converter in a starting mode. In a generating mode, the starter/generator system engages the engine to the dynamoelectric machine through a mechanical differential after the engine reaches self-sustaining speed. The starter/generator system combines the output of the engine and the torque converter to regulate the frequency of AC generated by the dynamoelectric machine within a range of frequencies suitable for on-board electrical equipment by dynamically regulating the flow of hydraulic fluid to the torque converter.

The present disclosure is directed toward overcoming one or more of the problems discovered by the inventors.

SUMMARY OF THE DISCLOSURE

A gas turbine engine is disclosed. The gas turbine engine includes a compressor, a combustor adjacent the compressor, a turbine adjacent the combustor, a shaft, a motor, a primary variable frequency drive, an auxiliary variable frequency drive, and an auxiliary motor. The compressor rotor assembly includes a plurality of compressor disk assemblies. The turbine includes a turbine rotor assembly including a plurality of turbine disk assemblies. The shaft is coupled to the compressor rotor assembly and at least one turbine disk assembly. The shaft includes a power output coupling providing mechanical power to external equipment. The motor is coupled to the shaft. The primary variable frequency drive is electrically connected to the motor and an AC power source. The primary variable frequency drive includes an AC to DC voltage converter, a DC to AC voltage inverter, and a DC power bus. The auxiliary variable frequency drive is electrically connected to the DC power bus of the primary frequency drive. The auxiliary variable frequency drive includes a DC to AC voltage inverter. The auxiliary motor is electrically connected to the auxiliary variable frequency drive. The primary variable frequency drive provides DC power to the auxiliary variable frequency drive.

Another gas turbine engine is disclosed. The gas turbine engine includes a compressor, a combustor adjacent the compressor, a turbine adjacent the combustor, a shaft, a starter motor, a starter variable frequency drive, and an auxiliary variable frequency drive. The compressor includes a compressor rotor assembly including a plurality of compressor disk assemblies. The turbine includes a turbine rotor assembly including a plurality of turbine disk assemblies. The shaft is coupled to the compressor rotor assembly and at least one turbine disk assembly. The shaft includes a power output coupling providing mechanical power to external equipment. The start motor is coupled directly to the shaft. The starter variable frequency drive is electrically connected to the starter motor and to an alternating current power source. The starter variable frequency drive has a DC power bus. The auxiliary variable frequency drive is electrically connected to the DC power bus of the starter variable frequency drive. The starter variable frequency drive provides DC power to the auxiliary variable frequency drive.

A method of driving an auxiliary motor of a gas turbine engine is also disclosed. The method includes monitoring an alternating current power source for a starter variable frequency drive with a controller. The method also includes controlling a starter motor, by the controller, to generate AC power. The method also includes converting the generated AC power to DC power with the starter variable frequency drive. The method further includes providing the DC power from the starter variable frequency drive to an auxiliary variable frequency drive electrically connected the auxiliary motor.

DETAILED DESCRIPTION

The systems and methods disclosed herein include a gas turbine engine including an auxiliary power system. In embodiments, the auxiliary power system includes a motor, a primary variable frequency drive, and at least one auxiliary variable drive unit. The motor is coupled to the shaft of the gas turbine engine and the primary variable frequency drive is electrically connected to the motor and an AC power source through an AC power bus. The auxiliary variable drive unit is electrically connected to the primary variable frequency drive through a Direct Current (DC) power bus. When the AC power source is disconnected or disrupted, the motor can be driven by the shaft of the gas turbine engine to provide AC power to the primary variable frequency drive. The primary variable frequency drive can convert the AC power to DC power and provide the DC power to the auxiliary variable drive unit.

The auxiliary variable drive unit may be electrically connected to a lube oil system, a fuel system, or other subsystem of the gas turbine engine to provide auxiliary power during a loss or interruption of the AC power source. Preventing the loss of power to the lube oil system, fuel system or other subsystem may avoid a shutdown of the gas turbine engine when the AC power source is lost or interrupted.

Figure 1:
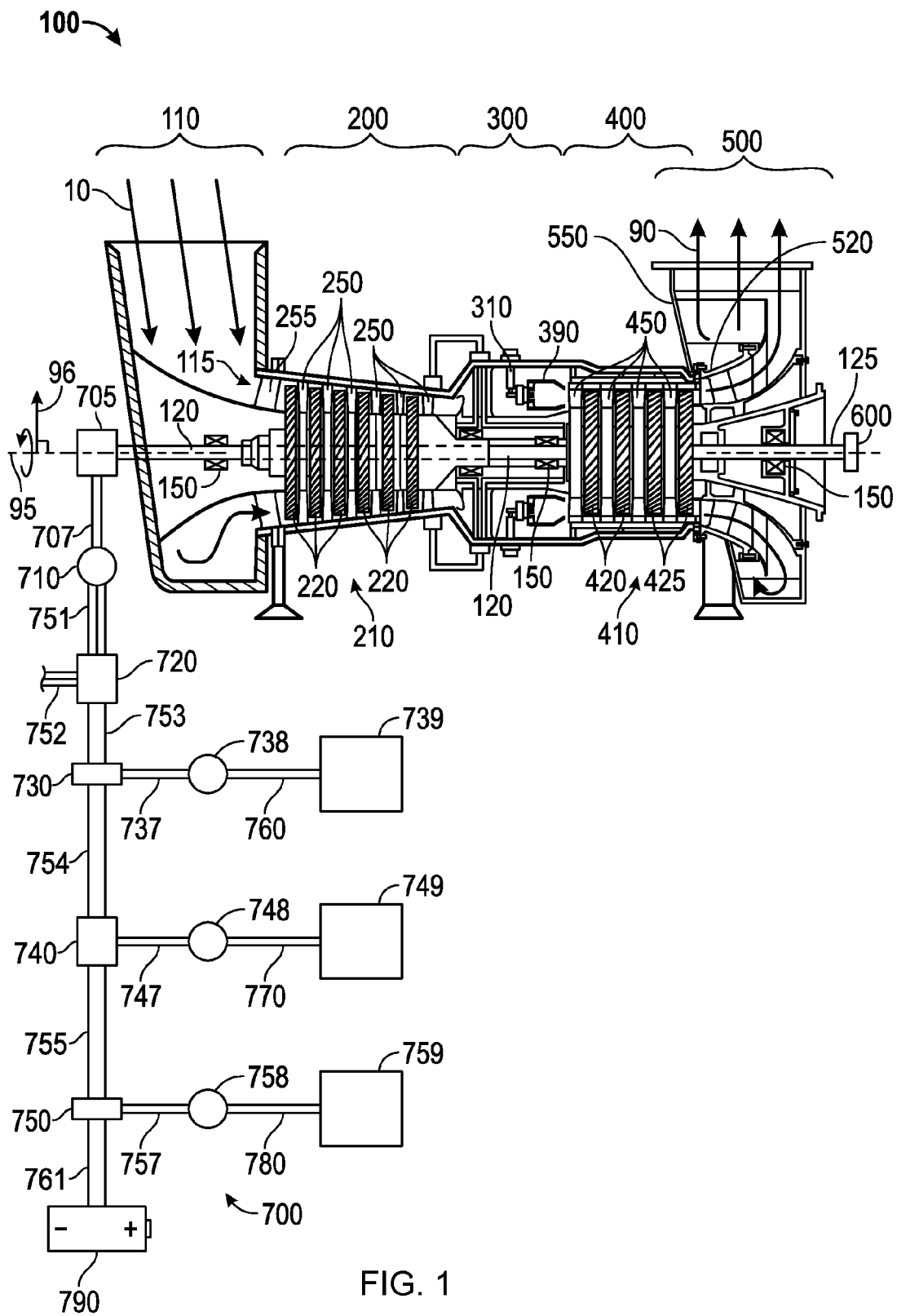
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine 100, which may be generally defined by the longitudinal axis of its shaft or shafts (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a compressor 200, a combustor 300, a turbine 400, an exhaust 500, and a power output coupling 600.

The compressor 200 includes a compressor rotor assembly 210, compressor stationary vanes ("stators") 250, and inlet guide vanes 255. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 310 and includes one or more combustion chambers 390. The fuel injectors 310 may be annularly arranged about center axis 95.

The turbine 400 includes a turbine rotor assembly 410, and turbine nozzles 450. As illustrated, the turbine rotor assembly 410 is an axial flow rotor assembly. The turbine rotor assembly 410 may include one or more gas producer turbine disk assemblies 420 and one or more power turbine disk assemblies 425. Gas producer turbine disk assemblies 420 and power turbine disk assemblies 425 each include a turbine disk that is circumferentially populated with turbine blades. Turbine nozzles 450 axially precede each of the gas producer turbine disk assemblies 420 and power turbine disk assemblies 425. Each turbine disk assembly paired with the adjacent turbine nozzles 450 that precede the turbine disk assembly is considered a turbine stage. Turbine 400 includes multiple turbine stages.

Gas turbine engine 100 may include a single or dual shaft configuration. In the embodiment illustrated, gas turbine engine 100 includes a gas producer shaft 120 and a power turbine shaft 125. The gas producer shaft 120 mechanically couples to compressor rotor assembly 210 and to gas producer turbine disk assemblies 420. The Power turbine shaft 125 couples to power turbine disk assemblies 425. Power turbine shaft 125 may also include power output coupling 600. The power output coupling 600 is configured to couple to and drive external equipment, such as a generator, a fluid pump, a gas compressor, or any other piece of external equipment that may be driven by a gas turbine engine as may be apparent to a person of ordinary skill in the art.

The exhaust 500 includes an exhaust diffuser 520 and an exhaust collector 550.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

The gas turbine engine 100 includes an auxiliary power system generally indicated as 700. The auxiliary power system 700 includes a motor 710 and a primary variable frequency drive (VFD) 720. The auxiliary power system 700 also includes at least one auxiliary variable frequency drive (VFD). The embodiment depicted in FIG. 1 includes three auxiliary VFDs: a lube oil system VFD 730, a fuel system VFD 740, and a third auxiliary VFD 750, which may be used by any other system requiring power. For example, the third auxiliary VFD 750 may be used by a cooling system or a ventilation system associated with the gas turbine engine 100. Alternative embodiments may include a single auxiliary VFD, a pair of auxiliary VFDs or more than three VFDs, as may be apparent to a person of ordinary skill in the art.

Motor 710 mechanically couples to gas producer shaft 120. In some embodiments, motor 710 couples to gas producer shaft 120 through a gearbox 705, as illustrated. A motor shaft 707 may connect motor 710 to gearbox 705. In other embodiments, motor 710 may couple directly to gas producer shaft 120. In embodiments with a single shaft configuration, motor 710 couples to the single shaft. In some embodiments, the motor 710 may be the starter motor 710 of gas turbine engine 100 and the primary variable frequency drive (VFD) 720 may be a starter VFD.

Primary VFD 720 is electrically connected to motor 710 by primary VFD AC power bus 751. Primary VFD 720 may output alternating current (AC) to motor 710 through primary VFD AC power bus 751. Primary VFD 720 is electrically connected to an AC power source such as a power grid or a diesel generator by Primary VFD AC input 752 and is electrically connected to the auxiliary VFDs (the lube oil VFD 730, the fuel system VFD 740, the third auxiliary VFD 750) by one or more DC power buses (753, 754, 755). As illustrated, the primary VFD 720 is electrically connected to the lube oil VFD 730 by a first DC power bus 753, the lube oil VFD 730 is electrically connected to the fuel system VFD 740 by a second DC power bus 754, and the fuel system VFD 740 is connected to the third auxiliary VFD 750 by a third DC power bus 755, in series. However, in some embodiments a single DC power bus may connect two or more of the auxiliary VFDs (the lube oil VFD 730, the fuel system VFD 740, the third auxiliary VFD 750) directly to the primary VFD 720 as should be understood by a person of ordinary skill in the art.

Additionally, in some embodiments, a stored energy unit 790 may also be connected to the primary VFD 720 through a stored energy DC power bus 761. In some embodiments, the stored energy unit 790 may be a battery. More specifically, the stored energy DC power bus 761 may connect to third Auxiliary VFD 750, which is connected to the third DC power bus 755, which is connected to the fuel system VFD 740, which is connected to the second DC power bus 754, which is connected to lube oil VFD 730, which is connected to the first DC power bus 753, which is connected to the Primary VFD 720. In other embodiments, the stored energy DC power bus 761 may be directly connected to the primary VFD 720. In some other embodiments, one or more DC motors may also be directly connected to the DC power bus 761 of the primary VFD 720.

The AC power source may provide three-phase AC power to the primary VFD 720, which may then distribute power to the various components of the gas turbine engine 100, including the rest of the auxiliary power system 700. The primary VFD 720 may include an AC to DC voltage converter and a DC to AC voltage inverter. Each of the auxiliary VFDs (the lube oil VFD 730, the fuel system VFD 740, the third auxiliary VFD 750) may also include an AC to DC voltage converter and a DC to AC voltage inverter.

Each of the auxiliary VFDs (the lube oil VFD 730, the fuel system VFD 740, the third auxiliary VFD 750) may be electrically connected to an auxiliary motor 738, 748, 758. For example, the lube oil VFD 730 is electrically connected to a lube oil motor 738 by a lube oil VFD AC power bus 737. The lube oil motor 738 is coupled to a lube oil pump 739 by a lube oil drive shaft 760. In some embodiments, a gearbox may be provided between the lube oil pump 739 and the lube oil motor 738. In such a configuration two or more drive shafts may be used to connect the gearbox to the lube oil pump 739 and lube oil motor 738, as may be apparent to a person of ordinary skill in the art.

Similarly, the fuel system VFD 740 is electrically connected to a fuel system motor 748 by a fuel system VFD AC power bus 747. The fuel system motor 748 is coupled to a fuel pump 749 by a fuel pump drive shaft 770. In some embodiments, a gearbox may be provided between the fuel pump 749 and the fuel system motor 748. In such a configuration two or more drive shafts may be used to connect the gearbox to the fuel pump 749 and fuel system motor 748, as may be apparent to a person of ordinary skill in the art.

Further, the third auxiliary VFD 750 is electrically connected to a third auxiliary motor 758 (such as a ventilation motor, cooling motor, or other subsystem motor) by an AC bus 757. The third auxiliary motor 758 is coupled to a subsystem component 759 by an auxiliary drive shaft 780. The subsystem component 759 may be any component needing to be driven by a motor. For example, the subsystem component 759 may be a ventilation fan in a ventilation system or a cooler in a cooling system for the gas turbine engine 100. In some embodiments, a gearbox may be provided between the subsystem component 759 and the third auxiliary motor 758. In such a configuration two or more drive shafts may be used to connect the gearbox to the subsystem component 759 and the third auxiliary motor 758, as may be apparent to a person of ordinary Stored energy unit 790 may provide DC power to the primary VFD 720 when the gas turbine engine 100 is shut down and the AC power source has been interrupted or lost. In some embodiments, the stored energy unit 790 may provide 120 Volts DC (VDC). However, the stored energy unit 790 may provide more or less that 120 VDC to the primary VFD 720 in other embodiments. Additionally, the stored energy unit 790 is charged by the primary VFD 720 when the gas turbine engine 100 is operating at self-sustaining speeds. The stored energy unit 790 may be a battery or a collection/rack of batteries. In one embodiment, the stored energy unit 790 is sized to power the motor 710 to rotate the gas turbine engine 100 up to self-sustaining speeds when the AC power source has been interrupted or lost.

The primary VFD AC power bus 751, primary VFD AC input 752, first DC power bus 753, second DC power bus 754, third DC power bus 755, lube oil VFD AC power bus 737, fuel system VFD AC power bus 747, third auxiliary VFD AC power bus 757, and stored energy DC power bus 761 may be electric wires/cables or other insulated conductors used to carry electricity. The primary VFD AC power bus 751, primary VFD AC input 752, lube oil VFD AC power bus 737, fuel system VFD AC power bus 747, and third auxiliary VFD AC power bus 757, may be configured to carry three-phase AC power.

Figure 2:
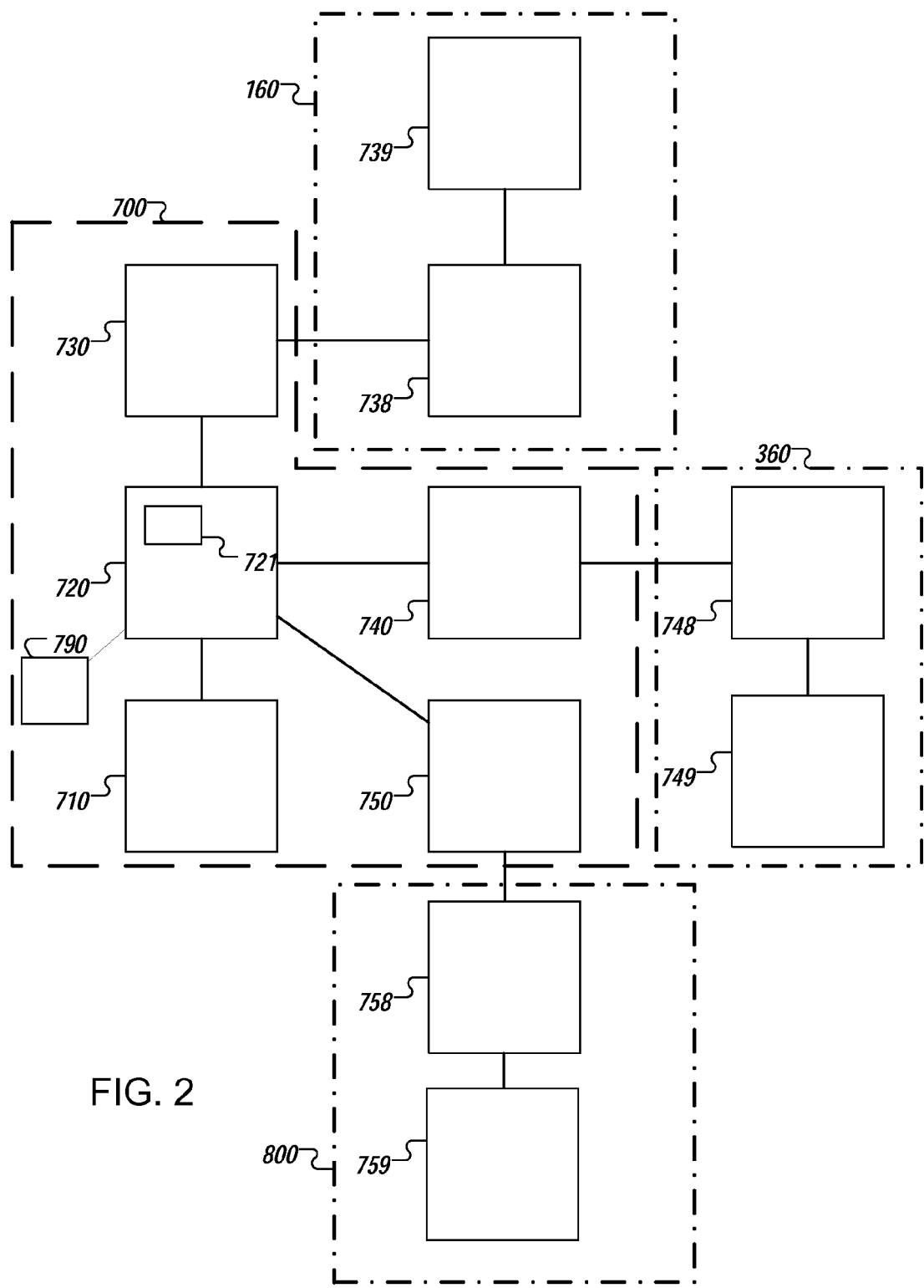
FIG. 2 is a functional block diagram including the auxiliary power system of FIG. 1.

FIG. 2 is a functional block diagram including the auxiliary power system 700 of FIG. 1. In some embodiments, the gas turbine engine 100 includes a lube oil system 160 and a fuel system 360. In some embodiments, the gas turbine engine 100 may also include at least one other subsystem 800, such as a ventilation system or a cooling system, or any other subsystem that may be apparent to a person of ordinary skill in the art. Lube oil system 160 is configured to circulate oil through the lube oil system 160 from a lube oil tank (not shown) to bearing assemblies 150, among other things. The fuel system 360 is configured to supply fuel to fuel injectors 310 of the combustor 300. The other subsystem 800 may be configured to control the operating temperature of the gas turbine engine 100 or circulate air around the gas turbine engine 100. As illustrated in FIG. 2, auxiliary power system 700 may be electrically connected to primary VFD 720, lube oil system 160, and fuel system 360.

Lube oil system 160 may include a lube oil pump 739 and a lube oil motor 738 mechanically coupled to the lube oil pump 739. In embodiments, the auxiliary power system 700 includes motor 710 electrically connected to the primary VFD 720 which is electrically connected to a lube oil VFD 730. The lube oil VFD 730 of the auxiliary power system 700 is electrically connected to the lube oil motor 738 to power the lube oil motor 738 and drive the lube oil pump 739.

Fuel system 360 includes a liquid fuel pump 749 mechanically coupled to a fuel system motor 748. In some embodiments, the fuel pump 749 may be a gas fuel compressor. In embodiments of the auxiliary power system 700, the primary VFD 720 is electrically connected to a fuel system VFD 740. The fuel system VFD 740 is electrically connected to the fuel system motor 748 to power the fuel system motor 748 and drive the fuel pump 749.

Subsystem 800, such as a ventilation system or cooling system, includes a subsystem component 759, such as a ventilation fan or cooler, mechanically coupled to a third auxiliary motor 758. In embodiments of the auxiliary power system 700, the primary VFD 720 is electrically connected to the third auxiliary VFD 750. The third auxiliary VFD 750 is electrically connected to the third auxiliary motor 758 to power the third auxiliary motor 758 and drive the subsystem component 759.

In some embodiments, the auxiliary power system 700 may also include the stored energy unit 790 electrically connected to the primary VFD 720.

Gas turbine engine 100 may include a control system including any number of controllers, control units, and modules for controlling and operating gas turbine engine 100 and the components and systems of gas turbine engine 100, such as the auxiliary power system 700, the lube oil system 160, the fuel system 360, and the subsystem 800. For example, as illustrated in FIG. 2, the control system may include a controller 721 incorporated into the Primary VFD that may control the operation of one or more of the gas turbine engine 100, the auxiliary power system 700, the lube oil system 160, the fuel system 360, and the subsystem 800. The controller 721 may include an electronic control circuit having a central processing unit (CPU), such as a processor, or micro controller. Alternatively, the control system may include programmable logic controllers or field-programmable gate arrays. The control system may also include memory for storing computer executable instructions, which may be executed by the CPU. The memory may further store data related to controlling, inter alia, the auxiliary power system 700, the lube oil system 160, the fuel system 360, and the subsystem 800. The control system may also include inputs and outputs to receive sensor signals and send control signals.

In the embodiment illustrated in FIG. 2, the controller 721 is incorporated into the primary VFD 720. However, in other embodiments, the controller 721 may be incorporated into another component of the gas turbine engine 100, such as the motor 710, for example, or may be a separate subsystem of the gas turbine engine 100.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500) Likewise, each turbine disk assembly may be associated with a numbered stage.

Once compressed air 10 leaves the compressor 200, it enters the combustor 300, where it is diffused and fuel is added. Air 10 and fuel are injected into the combustion chamber 390 via fuel injector 310 and combusted. Energy is extracted from the combustion reaction via the turbine 400 by each stage of the series of turbine disk assemblies. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

Motor 710, the primary VFD 720, and auxiliary VFDs 730, 740, 750 may generally operate off of AC power provided from a power grid. Each of the primary VFD 720, and auxiliary VFDs 730, 740, 750 may not be able to withstand a power loss longer than fifteen milliseconds, in which case, the primary VFD 720, and auxiliary VFDs 730, 740, 750 may shutdown. Once each of the primary VFD 720, and auxiliary VFDs 730, 740, 750 shuts down it can take several minutes to start back up. With the auxiliary VFDs 730, 740, 750 shut down the auxiliary motors 738, 748, 758 may also shut down causing other systems such as the lube oil system 160, fuel system 360, and/or other subsystem 800 to also shut down. When other components and systems, such as the lube oil system 160, fuel system 360, and/or other subsystem 800 are shut down, a complete shutdown of gas turbine engine 100 may be required. Such shutdowns may cause extended interruptions in the operation of gas turbine engine 100 and may negatively impact operator's processes.

The auxiliary power system 700 may use the continued rotation of the gas turbine engine 100 to generate AC power using the motor 710, convert the AC power to DC power by the primary VFD 720, and distribute the DC power to the auxiliary VFDs 730, 740, 750 through the DC power buses 753, 754, 755. Each of the auxiliary VFDs 730, 740, 750 may then power the auxiliary motors 738, 748, 758.

In the event that the AC power loss or interruption occurs prior to the gas turbine engine 100 achieving self-sustaining speed, the stored energy unit 790 may provide DC power to the primary VFD 720 to power the motor 710 to rotate the gas producer shaft 120 of the gas turbine engine 100 until self-sustaining speed is achieved.

Figure 3:
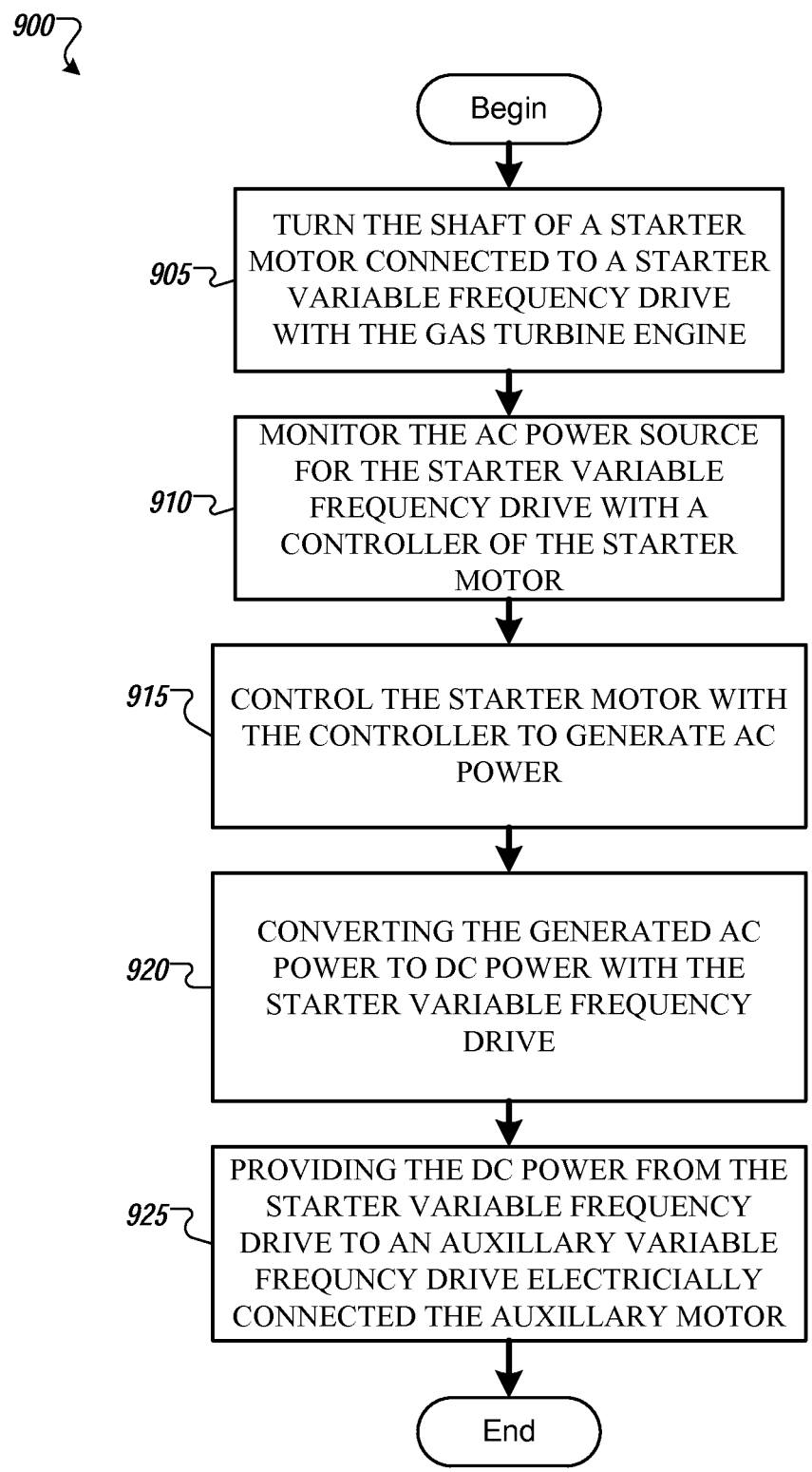
FIG. 3 is a flowchart of a method for driving an auxiliary motor of the gas turbine engine of FIG. 1 with the auxiliary power system.

FIG. 3 is a flowchart of a method 900 that may be performed by the controller 721 to drive one or more of the auxiliary motors 738, 748, 758 of the gas turbine 100 engine of FIG. 1 using the auxiliary power system 700. The method 900 may include the controller 721 controlling the gearbox 705 to turning or rotate the shaft 707 of the motor 710 connected to a primary VFD 720 with the gas turbine 100 at step 905. In a dual shaft configuration, the shaft 707 is connected to the gas producer shaft 120 of the gas turbine 100 by a gearbox 705. Specifically, the shaft 707 is rotated by a torque provided by the rotation of the turbine rotor assembly 410. In a single shaft configuration, the motor 710 may be connected to the gas producer shaft 120 without a gearbox 705.

The method 900 also includes monitoring the AC power level of an AC power source of the primary VFD 720 with the controller 721 of the motor 710 while turning the shaft 707 with the gas turbine engine 100 at step 910.

In step 915, the controller 721 controls the motor 710 to generate AC power through rotation of the shaft 707 by torque provided by the turbine disk assembly 425 of the case turbine engine 100. In some embodiments, the controller 721 may control the motor 710 to generate AC power when an interruption or loss of the AC power level of the AC power source is detected by the controller 721, For example, the controller 721 may control the motor 710 to rotate slower relative to gas turbine engine 100 such that the torque provided by the turbine disk assembly 425 of the gas turbine engine 100 drive the rotation of the motor 710 generating AC power. The AC power generated by the motor 710 is provided to the primary VFD 720 by the motor 710.

In other embodiments, the controller 721 may control the motor 710 to continuously generate AC power through rotation of the shaft 707 by torque provided by the turbine disk assembly 425 once the gas turbine engine 100 reaches self-sustaining speeds. Again, the AC power generated by the motor 710 is provided to the primary VFD 720 by the motor 710.

In step 920, the controller 721 controls the primary VFD 720 to convert the provided AC power to 120 VDC power using the AC to DC converter of the primary VFD 720. The 120 VDC power is provided to one or more of the auxiliary VFDs 730, 740, 750 (e.g. lube oil VFD 730, fuel system VFD 740, and third auxiliary VFD 750) through the DC power buses 753, 754, 755 in step 925.

The lube oil VFD 730 may convert the provided 120 VDC to AC power to drive the lube oil motor 738 to drive the lube oil pump 739 to continue to pump lube oil to the bearing assemblies 150 during an interruption of the AC power source. The fuel system VFD 740 may also convert the provided 120 VDC to AC power to drive the fuel system motor 748 to drive the fuel pump 749 to continue to pump fuel to the fuel injectors 310 of the combustor 300 during an interruption of the AC power source. The third auxiliary VFD 750 may also convert the provided 120 VDC to AC power to drive the third auxiliary motor 758 to continue to drive the subsystem component 759 (e.g. a ventilation fan of a ventilation system, a cooler of a cooling system, etc.) during an interruption of the AC power source.

In some embodiments, the control system may include an auxiliary power module, a lube oil module, a fuel module, and an additional subsystem module. The auxiliary power module, a lube oil module, a fuel module, and an additional subsystem module may be incorporated into the controller 721 or may be separate controllers independent from the controller 721.

The auxiliary power module is configured to control the motor 710 to generate AC power until the AC power source can be restored. The auxiliary power module may also be configured to control the primary VFD 720 to convert the generated AC power to DC power and distribute the DC power to the auxiliary VFDs (i.e. lube oil VFD 730, fuel system VFD 740, and third VFD 750).

The lube oil module is configured to control the lube oil VFD 730 to regulate the speed of the lube oil motor 738 and the lube oil pump 739. The fuel system module is configured to control the fuel system VFD 740 to regulate the amount of fuel supplied to the fuel injectors 310 of the combustor 300 by the fuel pump 749 driven by the fuel system motor 748. The additional subsystem module is configured to control the third auxiliary VFD 750 to regulate the speed of the third auxiliary motor 758 and the subsystem component pump 759 (e.g. a ventilation fan of a ventilation system, a cooler of a cooling system, etc.).

By providing an auxiliary power system as described above, operation of the gas turbine engine can be maintained during a loss of external power. By allowing continued operation of the gas turbine engine during external power loss, equipment down time and associated operating losses may be reduced. Additionally, by providing DC power from the primary VFD 720 to the auxiliary VFDs 730, 740, 750 through the DC power buses 753, 754, 755 transition from operating off of the external power source to operating off of the auxiliary power system with minimal switching.

The preceding detailed description is merely exemplary in nature and is not intended to limit the invention or the application and uses of the invention. The described embodiments are not limited to use in conjunction with a particular type of gas turbine engine. It will be appreciated that the gas turbine engine in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A gas turbine engine, comprising:
    a compressor including
        a compressor rotor assembly including a plurality of compressor disk assemblies;
    a combustor adjacent the compressor;
    a turbine adjacent the combustor, the turbine including
        a turbine rotor assembly including
            a plurality of turbine disk assemblies;
    a shaft coupled to the compressor rotor assembly and at least one turbine disk assembly, the shaft including a power output coupling providing mechanical power to external equipment;
    a motor coupled directly to the shaft;
    a primary variable frequency drive electrically connected to the motor and to an AC power source, the primary variable frequency drive including an AC to DC voltage converter, a DC to AC voltage inverter, and a DC power bus;
    an auxiliary variable frequency drive electrically connected to the DC power bus of the primary variable frequency drive, the auxiliary variable frequency drive including a DC to AC voltage inverter; and
    an auxiliary motor electrically connected to the auxiliary variable frequency drive,
    wherein the primary variable frequency drive provides DC power to the auxiliary variable frequency drive.

2. The gas turbine engine of claim 1, wherein the primary variable frequency drive comprises a controller configured to monitor an AC power level of the AC power source and control the motor to rotate in response to torque provided by rotation of the turbine rotor assembly to generate AC power when an interruption or loss of AC power of the AC power source is detected during operation of the gas turbine engine; and
    wherein the AC to DC voltage converter of the primary variable frequency drive is configured monitor the AC power of the AC power source and convert the AC power generated by the motor to DC power and provide the DC power to the auxiliary variable frequency drive when the interruption or loss of AC power of the AC power source is detected during operation of the gas turbine engine.

3. The gas turbine engine of claim 1, further comprising a drive shaft coupled to the auxiliary motor; and
    a lube oil pump coupled to the drive shaft, the lube oil pump configured to supply lube oil to bearing assemblies for the gas turbine engine.

4. The gas turbine engine of claim 1, further comprising a drive shaft coupled to auxiliary motor; and
    a fuel pump coupled to the drive shaft, the fuel pump configured to supply fuel to the combustor of the gas turbine engine.

5. The gas turbine engine of claim 1, further comprising a drive shaft coupled to the auxiliary motor; and
    a ventilation system having ventilation fans coupled to the drive shaft, the ventilation fans configured to move air through the ventilation system.

6. The gas turbine engine of claim 1, further comprising a drive shaft coupled to the auxiliary motor, and;
    a cooling system having coolers coupled to the drive shaft, the coolers configured to cool the gas turbine engine.

7. The gas turbine engine of claim 1, wherein the auxiliary variable frequency drive comprises a plurality of auxiliary variable frequency drives, each auxiliary variable frequency drive electrically connected to the DC power bus of the primary variable frequency drive; and
    wherein the auxiliary motor comprises a plurality of auxiliary motors, each auxiliary motor electrically connected to one of the plurality of auxiliary variable frequency drives.

8. A gas turbine engine, comprising:
    a compressor including
        a compressor rotor assembly including a plurality of compressor disk assemblies;
    a combustor adjacent the compressor;
    a turbine adjacent the combustor, the turbine including
        a turbine rotor assembly including
            a plurality of turbine disk assemblies;
    a shaft coupled to the compressor rotor assembly and at least one turbine disk assembly, the shaft including a power output coupling providing mechanical power to external equipment;
    a starter motor coupled directly to the shaft;
    a starter variable frequency drive electrically connected to the starter motor and to an alternating current power source, the starter variable frequency drive having a DC power bus; and
    an auxiliary variable frequency drive electrically connected to the DC power bus of the starter variable frequency drive;
    wherein the starter variable frequency drive provides DC power to the auxiliary variable frequency drive.

9. The gas turbine engine of claim 8, wherein the primary variable frequency drive comprises a controller configured to monitor an AC power level of the AC power source and control the starter to rotate in response to torque provided by rotation of the turbine rotor assembly to generate AC power when an interruption or loss of AC power of the AC power source is detected during operation of the gas turbine engine; and wherein the starter variable frequency drive is configured to monitor the AC power of the AC power source and convert the AC power generated by the motor to DC power and provide the DC power to the auxiliary variable frequency drive when the interruption or loss of AC power of the AC power source is detected during operation of the gas turbine engine.

10. The gas turbine engine of claim 8, further comprising a lube oil system comprising
a lube oil motor electrically connected to the auxiliary variable frequency drive;
a drive shaft coupled to the lube oil motor; and
a lube oil pump coupled to the drive shaft, the lube oil pump configured to supply lube oil to bearing assemblies for the gas turbine engine.

11. The gas turbine engine of claim 8, further comprising a fuel system comprising
a fuel system motor electrically connected to the auxiliary variable frequency drive;
a drive shaft coupled to the fuel system motor further comprising a drive shaft coupled to fuel system motor; and
a fuel pump coupled to the drive shaft, the fuel pump configured to supply fuel to the combustor of the gas turbine engine.

12. The gas turbine engine of claim 8, further comprising a ventilation system comprising
a ventilation motor electrically connected to the auxiliary variable frequency drive;
a drive shaft coupled to the ventilation motor; and
ventilation fans coupled to the drive shaft, the ventilation fans configured to move air through the ventilation system.

13. The gas turbine engine of claim 8, further comprising a cooling system comprising
a cooling motor electrically connected to the auxiliary variable frequency drive;
a drive shaft coupled to the cooling motor;
coolers coupled to the drive shaft, the coolers configured to cool the gas turbine engine.

14. The gas turbine engine of claim 8, wherein the auxiliary variable frequency drive comprises:
a lube oil variable frequency drive electrically connected to a lube oil motor, the lube oil motor coupled to a drive shaft, the drive shaft coupled to a lube oil pump configured to supply lube oil to bearing assemblies for the gas turbine engine; and
a fuel system variable frequency drive electrically connected to a fuel system motor, the fuel system motor coupled to a drive shaft, the drive shaft coupled to a fuel pump configured to supply fuel to the combustor of the gas turbine engine.

15. The gas turbine engine of claim 8, further comprising a stored energy unit electrically connected to DC power bus of the starter variable frequency drive, wherein the starter variable frequency drive provides DC power to the stored energy unit.

16. A method of driving an auxiliary motor of a gas turbine engine, the method comprising:
monitoring an alternating current power source for a starter variable frequency drive with a controller;
controlling a starter motor, by the controller, to generate AC power;
converting the generated AC power to DC power with the starter variable frequency drive;
providing the DC power from the starter variable frequency drive to an auxiliary variable frequency drive electrically connected the auxiliary motor.

17. The method of claim 16, wherein the controlling the starter motor to generate AC power comprises:
controlling the starter motor to turn slower relative to the gas turbine engine such that a rotation of the gas turbine engine and the shaft powers rotation of the starter motor to generate AC power when an interruption or loss of the alternating current power source occurs.

18. The method of claim 16, further comprising:
driving a lube oil pump to provide lube oil to bearing assemblies of the gas turbine engine with the auxiliary motor.

19. The method of claim 16, further comprising:
driving a fuel pump to provide fuel to a combustor of the gas turbine engine with the auxiliary motor.

20. The method of claim 16, wherein the providing DC power to an auxiliary variable frequency drive comprises:
providing DC power from the starter variable frequency drive to a lube oil variable frequency drive electrically connected to a lube oil motor;
driving a lube oil pump to provide lube oil to bearing assemblies of the gas turbine engine with the lube oil motor;
providing DC power from the starter variable frequency drive to a fuel system variable frequency drive electrically connected to a fuel system motor; and
driving a fuel pump to provide fuel to a combustor of the gas turbine engine with the fuel system motor.

* * * * *